(No Model.)

A. B. KURTZ.
Thill-Coupling.

No. 227,367.     Patented May 11, 1880.

Attest.
E. R. Hill
Jno. M. Stahl

Inventor.
Abraham B. Kurtz,
per Wm. Hubbell Fisher,
Atty.

N. PETERS, PHOTO-LITHOGRAPHER, WASHINGTON, D. C.

UNITED STATES PATENT OFFICE.

ABRAHAM B. KURTZ, OF CINCINNATI, OHIO.

THILL-COUPLING.

SPECIFICATION forming part of Letters Patent No. 227,367, dated May 11, 1880.

Application filed April 2, 1880. (No model.)

*To all whom it may concern:*

Be it known that I, ABRAHAM B. KURTZ, of Cincinnati, Hamilton county, Ohio, have invented certain new and useful Improvements in Thill-Couplings, of which the following is a specification.

The object of my invention is to provide means for easily and quickly connecting the thill to the vehicle and detaching it from the vehicle, and for preventing rattling when said thills are attached to the vehicle.

It consists, in general, of an axle-clip provided with forwardly-projecting hooks arranged to receive a particular description of thill-irons, a wedge-shaped bolt, which is elevated by a spring to hold the thills in position and prevent rattling, and which may be depressed by the hand of the operator to remove the thills from the vehicle, the construction and arrangement of the bolt, clip, and spring being of a novel and useful description.

Figure 1:
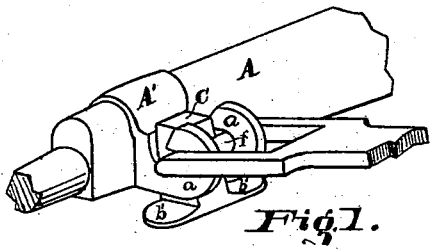
Figure 4:
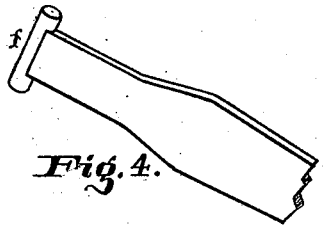
Figure 5:
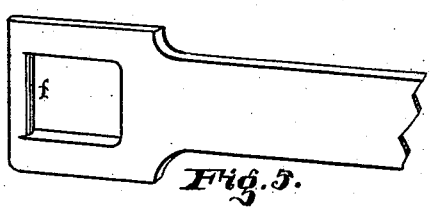
Figures 2, 3:
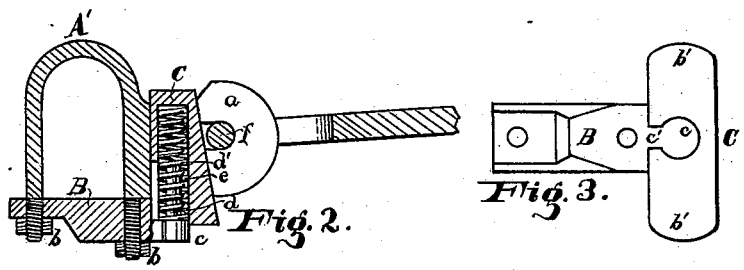

In the accompanying drawings, Figure 1 is a perspective view of my invention; Fig. 2, a central vertical section through the various parts, taken at right angles to the line of the axle and at the longitudinal center of the thill-iron; Fig. 3, a detached view of the clip, cross-bar, and wedge-bolt, looking from below upward; and Figs. 4 and 5 show two forms of thill-irons best adapted to use with my invention, Fig. 4 being for light and Fig. 5 for heavy vehicles.

A represents the axle of a vehicle, and A' the axle-clip, which latter is provided with the forwardly-projecting hooks $a$. The clip A' is secured to the axle by means of the nuts $b$ and intervening cross-bar B. This cross-bar B is provided with a forwardly-projecting head, $c$, which is connected to the main body of said cross-bar B by the constricted portion or neck $c'$. The head $c$ has an upwardly-projecting stud, $d$, which is surrounded by a spiral spring, $d'$.

C is a wedge-shaped bolt, which is retained in the position shown in Figs. 1 and 2 by the spring $d'$, and which can be depressed by pressing down on the ears $b'$ to remove the thills from the vehicle. This bolt C has a circular recess, $e$, extending nearly to the top of said bolt, for receiving the spring $d'$. This recess in the bolt C is of the same diameter as the head $c$ on the cross-bar B, said head passing into the recess $e$ when the bolt C is depressed.

In the side of the bolt C nearest to the axle-clip is a slot, $e'$, which extends about one-half of the length of the bolt, and is of just sufficient width to allow the constricted portion or neck $c'$ on the cross-bar B to pass into it, as is shown in Fig. 3, as the bolt C is depressed. This slot, being of less width than the diameter of the head $c$, prevents the bolt from being forwardly displaced.

The operation of my invention, as will be understood from the foregoing description, is as follows: When the thills are to be attached to the vehicle the cross-head $f$ of the thill-iron is placed on top of the bolt C and behind the ends of the hooks $a$ and the bolt depressed, while the cross-head $f$ is passed under the ends of the hooks $a$, and is readily moved forward to the position shown in Figs. 1 and 2, when the spring $d'$ forces the bolt C up until the inclined face presses against the cross-head $f$, as shown, thus holding the thills firmly in position and preventing any rattling, as there is a constant pressure exerted against the cross-head $f$ by the wedge-shaped bolt C.

To detach the thills it is only necessary to press down on the ears $b'$ of the bolt C until the upper end of said bolt is below the cross-head of the thill-iron, when the thills can be moved back and be lifted off.

From the above it will be seen that the operation of my device is very simple, and that the latter thoroughly secures the thills in position and prevents any rattling.

While I have confined myself in the foregoing description to the device as applied to thills, it will be perfectly obvious that it is equally applicable for pole-coupling.

What I claim as new and of my invention is—

1. The combination of the axle-clip A', provided with hooks $a$, cross-bar B, spring $d'$, wedge-shaped bolt C, and the thill-iron, substantially as and for the purposes specified.

2. The combination of the cross-bar B, provided with neck $c'$ and head $c$, and the wedge-shaped bolt C, having a recess to receive spring $d'$, substantially as and for the purposes specified.

3. The combination of the cross-bar B, provided with neck $c'$, head $c$, and stud $d$, the spring $d'$, wedge-shaped bolt C, and hooks $a$, substantially as and for the purposes specified.

4. The combination of the cross-bar B, provided with neck $c'$, head $c$, and stud $d$, the spring $d'$, wedge-shaped bolt C, hooks $a$, and the thill-iron, substantially as and for the purposes specified.

ABRAHAM B. KURTZ.

Witnesses:
 JNO. W. STREHLI,
 E. H. FOSTER.